United States Patent Office 3,385,659
Patented May 28, 1968

3,385,659
METAL PHOSPHATE GELS AND METHODS
FOR PRODUCING SAME
Gordon J. Turner and Casimer C. Legal, Jr., Baltimore, Md., assignors to W. R. Grace & Co., New York, N.Y., a corporation of Connecticut
No Drawing. Continuation-in-part of application Ser. No. 186,868, Apr. 12, 1962, now Patent No. 3,227,519. This application Oct. 21, 1965, Ser. No. 500,336
1 Claim. (Cl. 23—105)

ABSTRACT OF THE DISCLOSURE

A process for producing aluminum phosphate gels from variscite-strengite minerals and synthetic aluminum phosphate by reacting the aluminum phosphate with sulfur dioxide heating to evolve sulfur dioxide and separating the gel from the liquors.

This invention is a continuation-in-part of U.S. Serial No. 186,868, filed Apr. 12, 1962, now U.S. Patent 3,227,519, issued Jan. 4, 1966.

This invention relates to metal phosphates and to methods for their production. In one particular embodiment the invention relates to a method for recovering aluminum phosphate from certain minerals and ores containing the same. Another embodiment of the invention relates to a new aluminum phosphate gels and methods for their preparation.

There is known to be a series of naturally occurring aluminum phosphate minerals. Certain of these minerals, containing varying amounts of aluminum phosphate and ferric phosphate, are commonly classified as the variscite-strengite series of aluminum phosphate ores. Such ores include various variscites, ferrian-variscites, and aluminian strengites [see generally Dana's System of Minerology, 7th edition, vol. 2, pp. 756–757 (second printing 1957)]. Proposals have previously been made for recovering the aluminum and phosphorus content of such minerals and ores as aluminum hydroxide and sodium phosphate by treatment with caustic alkalis followed by selective precipitation. Insofar as known, no successful method has been devised for recovering aluminum phosphate, as such, from these ores. In view of the increasing consumption of aluminum phosphate for its known uses in glass and ceramics, in the laminating and bonding industries, and as a catalyst for various reactions; as well as the increasing interest in the use of aluminum phosphate as a catalyst in new reaction systems; it has now become desirable to be able to recover aluminum phosphate from naturally occurring ores and minerals containing the same. It has become equally desirable to prepare new forms of aluminum phosphate in order to broaden the fields of use for this compound, as well as to increase its efficiency and enhance its usefulness in known applications.

It is an object of this invention to provide a process for recovering aluminum phosphate in substantially pure form from variscite-strengite minerals containing the same. It is another object of this invention to provide a process for recovering aluminum phosphate as an essentially amorphous gel from aluminum phosphate-containing minerals of the variscite-strengite series. Still another object of this invention is to provide a new gel form of aluminum phosphate and methods for preparing the same. Further objects of this invention will become apparent to those skilled in the art in view of the more detailed description which follows.

It has been discovered that aluminum phosphate can be recovered from (1) ores of the variscite-strengite series by reacting the ores (2) with a saturated aqueous solution of sulfur dioxide under slight pressure for a sufficient period of time to dissolve at least a major proportion of the aluminum phosphate content of the ore, separating undissolved solids from the aluminum phosphate containing solution, and recovering aluminum phosphate from the said separated solution.

Aluminum phosphate minerals to which the above process is applicable are those of the variscite-strengite series. This series includes numerous minerals, such as those commonly called redondite, lucinite, scorrodite, barrandite, utahlite, chlorutahlite, sphaerite, and peganite. It is to be understood that any of these minerals and also any other similar naturally-occurring aluminum phosphate minerals can be treated in accordance with the teachings herein. In carrying out the process, the aluminum phosphate-containing mineral is reacted with an aqueous solution which is at all times maintained saturated or supersaturated with respect to $SO_2$. To accomplish this end, the dissolving reaction is carried out in a closed system maintained under pressures of from about 2 or 3 pounds per square inch gauge to about 40 or 50 pounds per square inch gauge.

The dissolving treatment can be commenced with an aqueous solution of sulfurous acid or by passing sulfur dioxide gas into an aqueous slurry containing the mineral to be treated. In either case, it will usually be found necessary to add sulfur dioxide gas to the system as treatment proceeds in order to maintain the $SO_2$ saturation.

Water may be used in any amount sufficient to retain in solution all of the aluminum phosphate dissolved by the treatment. Exact amounts of water used will thus depend upon the composition of the mineral to be treated and upon the amount of aluminum phosphate to be dissolved.

The dissolving treatment will proceed satisfactorily at ambient temperatures, e.g., about 20 to 25° centigrade. Treatment times can be reduced by using temperatures of up to about 90° centigrade but such temperatures also require substantial pressures in order to maintain the solution saturated with $SO_2$. Therefore it is usually preferred to operate at relatively low temperatures on the order of about 20 to about 40° centigrade.

The particle size of the aluminum phosphate-containing mineral is not critical. However, in order to reduce the time required to solubilize the desired amount of aluminum phosphate, it is generally desirable to grind the mineral to a size range of from about 5 to about 40 mesh (U.S. Standard). Heating the mineral, before or after grinding, to temperatures of about 150° centigrade to about 300° centigrade to remove the bound water which it contains also greatly reduces treatment time.

It is generally preferred to stir or otherwise agitate the aqueous slurry during the dissolving treatment to provide more intimate contact between the saturated $SO_2$ solution and the mineral solids.

After the desired amounts of aluminum phosphate have been dissolved by the $SO_2$ solution, the undissolved solids are separated. Separation can be accomplished in any conventional manner such as by filtration, decantation, centrifugation or the like. The separated solids contain substantially all of the silica or silicates present in the original mineral, as well as some undissolved phosphates. By properly choosing reaction temperatures, pressures and times, it is a simple matter to obtain in the separated solution a major proportion of the aluminum phosphate content of the previously named variscite minerals.

Aluminum phosphates can be recovered from sulfur dioxide solutions in a variety of ways. It has been found that a novel product is produced by using the new recovery method described below. This new method results in the novel aluminum phosphate gel of this invention.

In accordance with one embodiment of the present invention novel aluminum phosphate gels are produced by heating an aqueous sulfur dioxide solution of aluminum phosphate to remove $SO_2$. The heating can be accomplished by sparging the solution with a hot gas such as air, steam, combustion gases, flue gases or the like; or simply by boiling the solution at atmospheric or subatmospheric pressures. Boiling at subatmospheric pressures produces a gel which has higher surface area and pore volume after activation.

Evolution of $SO_2$ from the solution in the manner described causes precipitation of aluminum phosphate in the form of a voluminous thixotropic gel. Chemical analysis of the gel varies with the dilution of the solution from which it is produced. Gels with higher aluminum content are produced from more dilute solutions. The $Al_2O_3$ to $P_2O_5$ weight ratio ranges from about 0.6 to about 1.1. Corresponding $Al_2O_3$ to $P_2O_5$ mole ratios are between about .85 and about 1.55. Free water is readily removed from the gels by drying under vacuum at temperatures of 65° to 95° centigrade for from about 3 hours to about 24 hours. The dried gels can be activated by calcination in air at temperatures of from about 150° to about 300° centigrade. Activated gels having an $Al_2O_3$ to $P_2O_5$ weight ratio of from about 0.65 to about 0.70 and an $Al_2O_3$ to $P_2O_5$ mole ratio of from about 0.9 to about 1.0 have been made from moderately concentrated aqueous sulfur dioxide solutions of aluminum phosphate while a gel having an $Al_2O_3$ to $P_2O_5$ mole ratio of about 1.4 (corresponding to a weight ratio of about 1.0) has been made from a dilute solution. The activated gels have surface areas ranging from about 110 to about 255 square meters per gram and pore volumes ranging from about 0.30 to about 0.75 cubic centimeters per gram, as determined by standard methods for measuring these physical properties. The gels are suitable for use as a bonding agent. Activated gels are useful as desiccants and are particularly effective at low relative humidities, e.g., from about 10% to about 30% relative humidity. The activated gels can also be used as catalysts for the hydrogenation of castor oil. Conditions, concentrations, etc. for these catalytic uses have been previously described in U.S. Patent 2,113,241 and British Patent 317,391, respectively.

It should be noted at this point that the novel aluminum phosphate gels described above can be made from any aqueous sulfur dioxide solution of aluminum orthophosphate. Thus any aluminum orthophosphate containing material which will dissolve in saturated $SO_2$ solution could be used as the basic raw material. For example, it is possible to dissolve a pure aluminum orthophosphate such as $AlPO_4 \cdot 2H_2O$ (also known as variscite similarly as the minerals containing it) in a saturated aqueous solution of sulfur dioxide, and then recover aluminum orthophosphate gels by proceeding in the manner described above. Impure aluminum phosphates such as the aluminum phosphate sludge produced in purification of wet process phosphoric acid (see e.g., Kirk-Othmer, "Encyclopedia for Chemical Technology," vol. 10 (1953), pp. 429–430) can also be converted to a very useful product by use of the process of this invention.

Also suitable for use in this invention are synthetic aluminum phosphates, i.e., those prepared by reacting orthophosphoric acid ($H_3PO_4$) with an available aluminum cation containing material. Suitable for such purpose are: aluminum basic acetate, aluminum hydroxide, aluminum nitrate, aluminum sulfate and others.

Any of the aluminum phosphates suitable in this invention are generally referred to in the art as aluminum orthophosphates or $AlPO_4$.

The invention will be further illustrated by the following non-limiting specific examples.

Example 1.—Extraction of aluminum phosphate from a ferrian-variscite

A ferrian-variscite ore from Mexico was dehydrated by heating for about two hours at 200° centigrade. Analysis of the original ore and the dehydrated ore was as follows:

|  | Original (as received) | Dehydrated (2 hours) |
| --- | --- | --- |
| $Al_2O_3$ | 24.5 | 30.8 |
| $Fe_2O_3$ | 3.9 | 4.3 |
| $P_2O_5$ | 36.6 | 47.9 |
| Volatiles at 200° C | 20.0 | (1) |

1 Nil.

The dehydrated ore was ground to pass through a 20 mesh screen and 100 grams of the ground ore was slurried in a solution containing 78 grams of sulfur dioxide in 300 milliliters of water. The slurry was placed under a pressure of about 10 pounds per square inch gauge and was continuously agitated for about one hour while maintaining a temperature of 21° centigrade. Undissolved solids were separated from the solution by centrifugation. Analysis of these solids showed that they contained virtually all of the silica and siliceous gangue present in the ore treated, together with about one-half of the iron. Substantially all of the aluminum phosphate had passed into solution together with the other half of the iron phosphate originally present in the ore. The solution was quite clear.

Example 2.—Preparation of aluminum phosphate gel

A clear, aqueous solution of aluminum phosphate and sulfur dioxide prepared as described in Example 1 was placed on a steam bath and boiled to evolve sulfur dioxide. A voluminous thixotropic gel was formed. The gel was dried at about 90° centigrade and then activated by calcining at 200° centigrade for about two hours. Analysis after drying and activation showed that the $Al_2O_3$ to $P_2O_5$ mole ratio was 0.91. The activated gel was useful as a desiccant. It was a particularly good water adsorbent at 10% and 20% relative humidity.

Example 3

Another variscite ore was dehydrated by heating for 5 hours at temperatures of about 190° to 196° centigrade. The dehydrated ore analyzed 20.3% $P_2O_5$, 22.37% $Al_2O_3$ and 2.67% $Fe_2O_3$. The dehydrated ore was ground to pass through a 20 mesh screen. A slurry containing 200 grams of the ground ore in 1200 milliliters of water was prepared and placed in a closed container. Sulfur dioxide gas was bubbled into the slurry at a rate of 5 grams per minute for 30 minutes while the system was maintained under a pressure of 250 millimeters of mercury (about 5 pounds per square inch gauge). After $SO_2$ addition was completed the reaction mixture was maintained at the stated pressure for an additional 30 minutes after which it was centrifuged for 10 minutes to segregate undissolved solids. The solids were then filtered out of the solution. The filter cake (designated sample 3C for convenience) was kept for further treatment, described below. The solution was again placed under a positive pressure of 250 millimeters of mercury and $SO_2$ gas was bubbled in at 5 grams per minute for 15 minutes to insure complete solubilization of any possible suspended solids. No undissolved residue was obtained upon a second filtration of the thus treated solution.

The major portion of the solution was boiled on a steam bath to evolve sulfur dioxide. After a short time a thick voluminous gel precipitated. The gel was filtered out of the remaining liquor, washed with water, again filtered and then vacuum dried at 65° centigrade overnight (about 16 hours). The dried gel was activated by calcination for 4 hours at 200° centigrade. The activated gel weighed 54.9 grams. It was designated as sample 3A. A second gel prepared in exactly the same manner except that it was washed twice with water (instead of once) before drying and activation, was designated as Sample 3E.

A second smaller portion of the aqueous sulfur dioxide solution was boiled at temperatures of from about 65° to 70° centigrade by applying a vacuum thereto. A voluminous gel again formed as the sulfur dioxide was evolved under these conditions. The vacuum-gelled sample was dried over magnesium perchlorate in a vacuum desiccator for about 16 hours (overnight), slurried in water, refiltered, again vacuum dried overnight and then activated by calcining for 4 hours at 200° centigrade. This gel, weighing 18.5 grams, was designated sample 3B.

The filter cake (sample 3C described above) was washed with water and drained dry on a vacuum filter. The filtrate and the wash liquors were combined, thus giving a sulfurous acid solution of aluminum phosphate similar to the main solution from which gels 3A and 3B were prepared, but much more dilute (because of the wash waters). The dilute solution was boiled under vacuum at temperatures of 65° to 70° centigrade to evolve $SO_2$. The gel which precipitated was dried and activated in the same manner as sample 3B except that acetone (instead of water) was used as the gel washing liquid. The dried and activated gel was designated sample 3D.

The chemical and physical properties of the gels 3A, 3B, 3D and 3E were determined. Results are shown in Table I.

TABLE I.—ALUMINUM PHOSPHATE GELS FROM AQUEOUS SULFUR DIOXIDE SOLUTIONS

|  | 3A | 3B | 3D | 3E |
|---|---|---|---|---|
| Chemical Analysis, Percent by Weight: | | | | |
| Aluminum as $Al_2O_3$ | 35.14 | 34.08 | 34.24 | 35.32 |
| Phosphate as $P_2O_5$ | 50.60 | 50.50 | 34.50 | 50.90 |
| Iron as $Fe_2O_3$ | 2.66 | 2.36 | 3.59 | 2.05 |
| Physical Properties: | | | | |
| Surface Area (square meters per gram) | 120 | 228 | 218 | 159 |
| Pore Volume (cubic centimeters per gram) | .40 | .72 | .64 | .57 |
| Water Adsorption (grams per 100 grams) at— | | | | |
| 10% Relative Humidity | 4.89 | | | 5.12 |
| 20% Relative Humidity | 7.99 | | | 8.06 |

Example 4.—Preparation of Aluminum Phosphate From Synthetic Materials 51.5 grams aluminum basic acetate [$Al_2O(CH_2COO)_4$] was dissolved in 400 milliliters of water and precipitated with 32 grams $H_3PO_4$ (85% by weight). The resulting aluminum orthophosphate ($AlPO_4$) slurry was dissolved by adding sulfur dioxide under 10 p.s.i.g. pressure for a short period until a clear aqueous solution was observed. This solution was heated at low heat under vacuum to evolve sulfur dioxide. A voluminous clear thixotropic gel was formed. The gel was dried at about 95° centigrade and then activated by calcining at 200° centigrade for about four hours. Analysis after drying and activation showed that the $Al_2O_3$ to $P_2O_5$ mole ratio was 0.95. The activated gel had a surface area of 251 meters² per gram, and a pore volume of 0.33 cubic centimeters per gram. The activated gel was useful as a desiccant. It was a particularly good water adsorbent at 10% and 20% relative humidity, values being 11.39 (gms./100 gms.) and 14.76 (gms./100 gms.) respectively.

We claim:
1. A process for producing an $AlPO_4$ gel having an aluminum to phosphate mole ratio expressed as $Al_2O_3$ to $P_2O_5$ between about 0.85 and 1.55 and characterized by a surface area between about 110 and about 255 square meters per gram and a pore volume between about 0.30 and about 0.75 cubic centimeters per gram after activation at a temperature of about 200° centigrade, which comprises reacting an $AlPO_4$ chosen from the group consisting of minerals of the variscite-strengite series and synthetic $AlPO_4$ with a saturated aqueous solution of sulfur dioxide at a temperature of 20 to 40° C. under pressure of about 2 to about 50 p.s.i.g. while agitating, for a sufficient period of time to dissolve at least major portion of the aluminum phosphate, separating the undissolved solvent from the aluminum phosphate-containing solution, heating the thus produced solution at pressures not greater than about atmospheric pressure to a temperature sufficient to evolve sulfur dioxide therefrom, and separating from the remaining liquors the $AlPO_4$ gel thereby produced.

References Cited
UNITED STATES PATENTS

| 2,538,867 | 1/1951 | Greger | 23—105 |
| 2,924,509 | 2/1960 | Huber et al. | 23—105 |
| 3,271,299 | 9/1966 | Kearby | 208—114 |

FOREIGN PATENTS

| 832,374 | 4/1960 | Great Britain. |

OSCAR R. VERTIZ, *Primary Examiner.*

L. A. MARSH, *Assistant Examiner.*